E. J. POMMER.
SHEATH FOR KNIVES.
APPLICATION FILED MAR. 6, 1918.
1,297,008.
Patented Mar. 11, 1919.
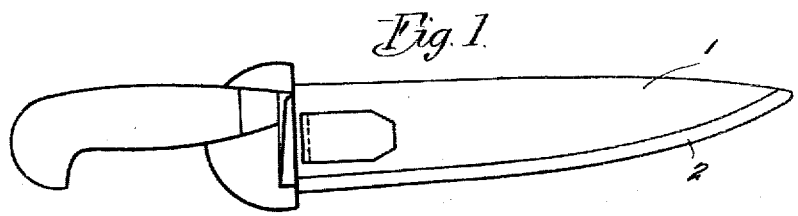
Fig. 1.
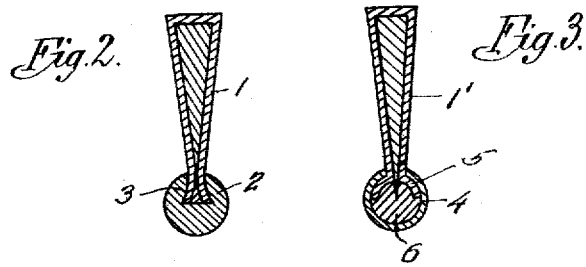
Fig. 2.  Fig. 3.
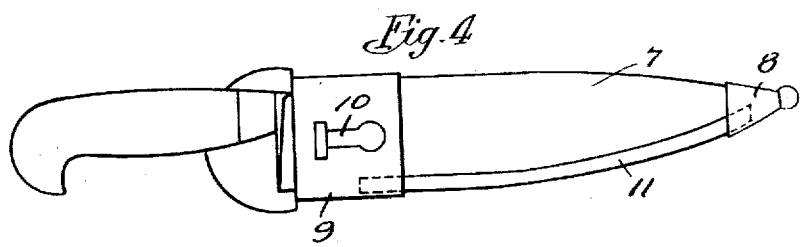
Fig. 4.
Fig. 5.
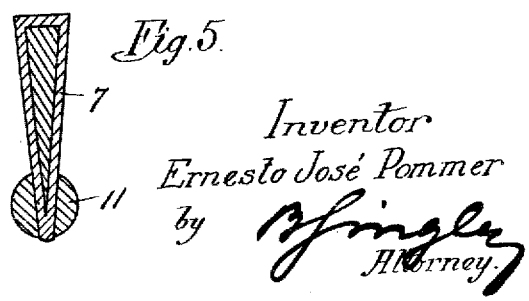
Inventor
Ernesto José Pommer
by
Attorney

UNITED STATES PATENT OFFICE.

ERNESTO J. POMMER, OF BUENOS AIRES, ARGENTINA.

SHEATH FOR KNIVES.

1,297,008.

Specification of Letters Patent.  Patented Mar. 11, 1919.

Application filed March 6, 1918.  Serial No. 220,867.

*To all whom it may concern:*

Be it known that I, ERNESTO J. POMMER, a citizen of Argentina, and a resident of Buenos Aires, Argentina, have invented certain new and useful Improvements in Sheaths for Knives, of which the following is a specification.

This invention relates to improvements in sheaths for knives and similar cutting tools. The invention is described in the following specification and illustrated in the accompanying drawing in its application to knives. It is obvious, however, that the invention may also be applied to containers for sickles, scythes, scissors or similar articles provided with a cutting edge which requires regrinding at frequent occasions.

An object of the invention is to combine with a container of a cutting tool grinding elements rigidly attached thereto and mounted on the outside thereof, whereby said container may be used as a sharpening steel, whetstone or the like.

Another object of the invention is to secure these grinding elements to the container at a longitudinal marginal portion thereof, and to utilize the grinding tool for maintaining portions of the container in predetermined relation to each other.

Other objects of the invention will be more clearly apparent from the following specification, appended claims and the accompanying drawings, wherein—

Figure 1 is a side elevation of a knife-sheath having the grinding tool combined therewith, Fig. 2 is a longitudinal section on a larger scale through said knifesheath;

Fig. 3 is a longitudinal section through a modified form of the knifesheath combined with the grinding tool;

Fig. 4 shows in side elevation a modified form of a container for the knife, and Fig. 5 is a sectional view on a larger scale through said modified embodiment.

As will be seen from Fig. 1, the container 1 having the form of an ordinary knife-sheath, is tapering toward one end, and a curved longitudinal margin thereof with which the cutting edge of the knife remains in contact upon insertion of the knife in the container, is provided with a grinding tool of any known construction. If the container 1 is made of sheet metal, the grinding element 2, being preferably made of steel, has an undercut groove, as shown in Fig. 2 and indicated at 3. The two curved edge portions of the container 1 are inserted into said undercut groove and then spread apart so as to engage the lateral walls of the groove, preventing thereby the withdrawal of the sharpening element 2 from the container. If it is desired to use this container as a sharpening tool the knife is withdrawn and guided with its cutting edge along the element 2 in the ordinary and well known operation of sharpening.

In the modification illustrated in Fig. 3 the sharpening element is shown as a tubular element 4, which overlies the marginal portions 5 of the container 1'. The marginal portions 5 are forced into engagement with a core 6 of approximately circular cross-section by the tubular sharpening element 4, the upper half of this core being partly cut away so as to accommodate the marginal portions 5, which are pressed against this core by the tubular sharpening element 4.

In the embodiment illustrated by Figs. 4 and 5, the sheath or container may be constructed of leather or some other suitable material of which these sheaths are frequently made. The point of this leather sheath is equipped with a metallic cap 8, and the open end of said sheath also has a metallic ferrule 9, which may be equipped with a key-hole slot 10 or the like to facilitate the suspension of the sheath from a hook on the belt of the wearer, not shown in the drawing. The sharpening element 11 in this embodiment consists of two strips of steel, emery stone or the like, which have approximately semi-circular cross-sections, and the front and rear ends of each strip are forced into contact with the body of the knife-sheath by being inserted into the space between the knifesheath 7 and the cap 8 and ferrule 9 respectively.

It is obvious that in this construction also the sheath may be used for sharpening a cutting element, and that in this instance, like in the other modifications, the sharpening element is arranged at both sides of the container and on the exterior surface of the same. The sharpening element may therefore be used like any ordinary sharpening steel or stone and naturally may not only be utilized to sharpen the cutting implement which fits the sheath, but also any other cutting implement.

I claim:

1. A container for a cutting implement, comprising a receptacle, and a sharpening element secured to said receptacle adjacent a marginal portion of the same and accessible from the outside of the receptacle.

2. A container for a cutting implement, comprising a receptacle, and a sharpening element secured to said receptacle adjacent one marginal portion of the same on two opposite surface portions thereof, said sharpening element being accessible from the outside of the container.

3. A container for a cutting implement, comprising a knifesheath having a straight and a curved edge, and a sharpening element secured to the curved edge of the container and on the outer surface of the same so as to be accessible from both sides of said container.

4. A container for a cutting implement, comprising in combination with a knife-sheath made of metal and having two edge portions, a sharpening element provided with an opening between which said two edge portions are secured, the edge portions being spread apart in the interior of said sharpening element.

5. A container for a cutting implement, comprising a receptacle having two side walls and a back connecting said side walls, the ends of said side walls opposite said back being fastened to each other by a sharpening element into which the edges of said side walls are inserted, said sharpening element being located along the edges of the container.

Signed at Buenos Aires, Argentina, this fourteenth day of January, A. D. 1918.

ERNESTO J. POMMER.

Witnesses:
ROBERTO W. POMMER,
ERIH APPELBAUM.

Copies of this patent may be obtained for five cents each, by addressing the "Commissioner of Patents. Washington, D. C."